US012743430B2

(12) United States Patent
Pandit et al.

(10) Patent No.: US 12,743,430 B2
(45) Date of Patent: Sep. 22, 2026

(54) METHOD AND SYSTEM TO RESPOND ON MUTLIDIMENSIONAL USER QUERIES ON FLOOD IN AN SPECIFIED REGION

(71) Applicant: Tata Consultancy Services Limited, Mumbai (IN)

(72) Inventors: Ankur Pandit, Indore (IN); Suryakant Ashok Sawant, Pune (IN); Jayantrao Mohite, Thane (IN); Srinivasu Pappula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 19/251,555

(22) Filed: Jun. 26, 2025

(65) Prior Publication Data

US 2026/0099497 A1 Apr. 9, 2026

(30) Foreign Application Priority Data

Oct. 9, 2024 (IN) ............................ 202421076622

(51) Int. Cl.
*G06F 16/00* (2019.01)
*G06F 16/2457* (2019.01)
*G06F 16/29* (2019.01)

(52) U.S. Cl.
CPC .......... *G06F 16/2457* (2019.01); *G06F 16/29* (2019.01)

(58) Field of Classification Search
CPC .................................................. G06F 16/2457
See application file for complete search history.

(56) References Cited

U.S. PATENT DOCUMENTS

2022/0414228 A1* 12/2022 Difonzo ................ G06F 40/169

FOREIGN PATENT DOCUMENTS

CN 118134729 B 7/2024

OTHER PUBLICATIONS

Munawar, Hafiz Suliman et al., "Remote sensing methods for flood prediction", Title of the item: Sensors, Date: 2022, Publisher: MDPI, Link: https://www.researchgate.net/publication/358184470_Remote_Sensing_Methods_for_Flood_Prediction_A_Review.

(Continued)

*Primary Examiner* — Ajith Jacob
(74) *Attorney, Agent, or Firm* — Finnegan, Henderson, Farabow, Garrett & Dunner, LLP

(57) ABSTRACT

The embodiments of the present disclosure address unresolved problems of assigning weightage to information sources in a GenAI model for responding to user queries on flood. Embodiments herein provide a method and system for responding to multidimensional user queries on flood with remote sensing and auxiliary data integration. Herein, the user query is responded by analyzing big geospatial vector database comprising spatially distributed flood inundation maps and flood probability maps along with other auxiliary datasets in vector form provided to the GenAI model. The other auxiliary datasets include flood event history, terrain information, river and stream network, floodplain map, climatic data, previous damage reports, soil and land use data. These auxiliary datasets will be continuously updated time-to-time. Importantly, a conveyor belt weighting model is introduced to provide weights to each source of information and the response by GenAI model is prepared based on the weights assigned to the information sources.

18 Claims, 13 Drawing Sheets

(56) References Cited

OTHER PUBLICATIONS

Singh, Yogesh Kumar et al., "Flood Response System—A Case Study", Title of the item: Hydrology, Date: 2017, Publisher: MDPI, Link: https://www.mdpi.com/2306-5338/4/2/30.

* cited by examiner

Figure 3:
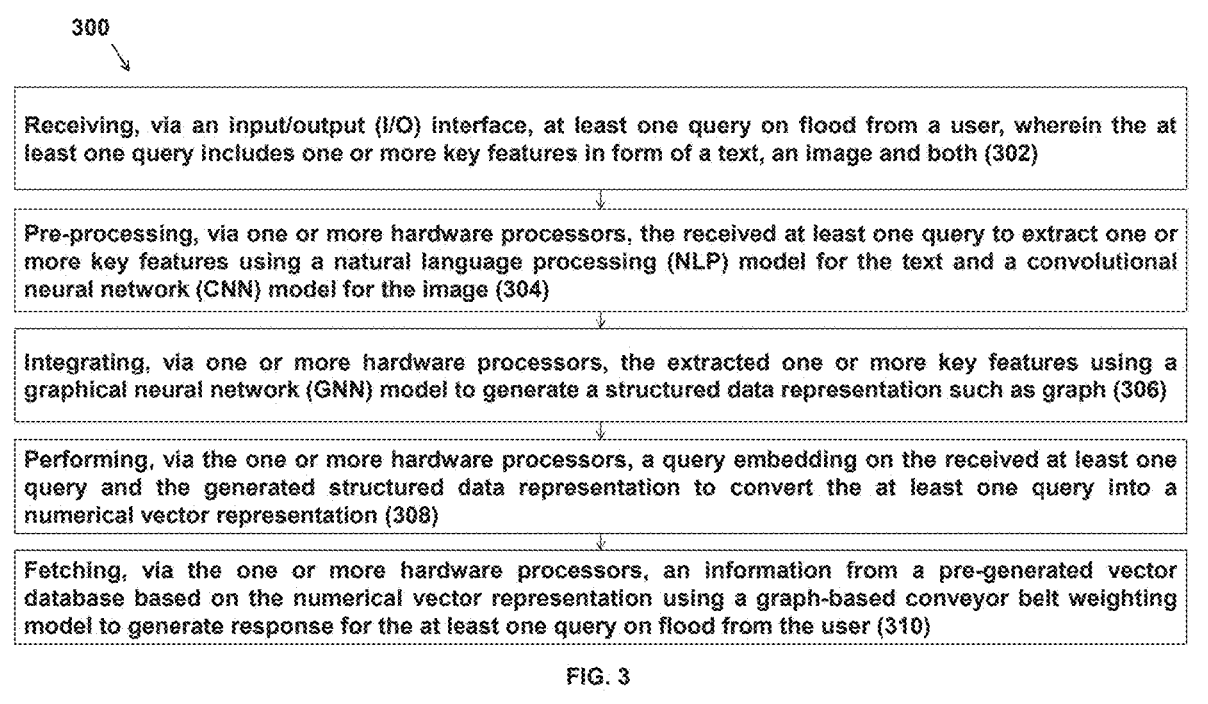

300

Receiving, via an input/output (I/O) interface, at least one query on flood from a user, wherein the at least one query includes one or more key features in form of a text, an image and both (302)

Pre-processing, via one or more hardware processors, the received at least one query to extract one or more key features using a natural language processing (NLP) model for the text and a convolutional neural network (CNN) model for the image (304)

Integrating, via one or more hardware processors, the extracted one or more key features using a graphical neural network (GNN) model to generate a structured data representation such as graph (306)

Performing, via the one or more hardware processors, a query embedding on the received at least one query and the generated structured data representation to convert the at least one query into a numerical vector representation (308)

Fetching, via the one or more hardware processors, an information from a pre-generated vector database based on the numerical vector representation using a graph-based conveyor belt weighting model to generate response for the at least one query on flood from the user (310)

Agriculture
Area
Geolocation
Flood
Crop
Rajkot

FIG. 4D

METHOD AND SYSTEM TO RESPOND ON MUTLIDIMENSIONAL USER QUERIES ON FLOOD IN AN SPECIFIED REGION

PRIORITY CLAIM

This U.S. patent application claims priority under 35 U.S.C. § 119 to: Indian Patent Application number 202421076622, filed on Oct. 9, 2024. The entire contents of the aforementioned application are incorporated herein by reference.

TECHNICAL FIELD

The disclosure herein generally relates to the field of flood responsive systems, and more particularly, a method and system for responding to multidimensional user queries on flood with remote sensing and auxiliary data integration.

BACKGROUND

Floods are among the most devastating natural disasters, causing widespread damage across various sectors. Their impacts can be both immediate and long-term, affecting agriculture, urban areas, and other critical sectors in diverse ways. The agricultural sector suffers more significant losses during and post flood events. In the agriculture sector, floodwaters can inundate vast agricultural lands, leading to the destruction of crops, particularly those in their growth stages. Prolonged waterlogging can suffocate plants, leading to significant yield losses. Flooding often results in soil erosion, nutrient depletion, and the deposition of sand and silt on fertile lands, rendering the soil less productive. The loss of topsoil, which contains the majority of nutrients, can reduce the land's agricultural potential. Also, floods can lead to the loss of livestock, which are essential for the livelihoods of many farmers. Additionally, the destruction of agricultural infrastructure such as irrigation systems, storage facilities, and farm machinery exacerbates the economic impact. Stagnant water left behind after floods can become breeding grounds for pests and diseases, affecting both crops and livestock.

Existing models leavening latest and evolving technology such as Generative Artificial Intelligence (GenAI) model, implementing a system for answering/generating flood related queries can offer numerous advantages, especially when leveraging vast amounts of knowledge. The term GenAI refers to computational techniques that are capable of generating seemingly new, meaningful content such as text, raster images, or audio from training data. GenAI models can integrate data from diverse sources such as historical flood records, real-time weather data, geographic information systems (GIS), and scientific research. This enables the system to provide comprehensive, context-aware answers. By continuously learning from new data, a GenAI model can offer the latest information, such as current flood warnings, ongoing flood events, and the latest research on flood management strategies. GenAI can tailor responses based on the user's location, the type of query, and their specific needs (e.g., a farmer seeking advice on crop protection strategies for flooding events). This personalization enhances the relevance and usefulness of the information provided. The system can simulate different flood scenarios based on user inputs (e.g., rainfall forecasts, river levels) and generate suggestions tailored to the user's context.

Deploying a GenAI based system can reduce the need for extensive human resources and infrastructure, leading to significant cost savings in flood management and emergency response operations. By leveraging vast amounts of data, providing personalized and real-time responses, and supporting decision-making processes, such a system can significantly enhance flood preparedness, response, and mitigation efforts. Its scalability, cost-effectiveness, and ability to educate and empower users make it an invaluable tool in the face of increasing flood risks.

However, assigning weightage to information sources in a GenAI based system comes with several challenges such as dynamic nature of information, diverse types of queries, bias in source selection, complexity in balancing multiple sources, verifiability and source reliability etc. that can impact the accuracy, relevance, and reliability of the responses generated.

SUMMARY

Embodiments of the present disclosure present technological improvements as solutions to one or more of the above-mentioned technical problems recognized by the inventors in conventional systems. For example, in one embodiment, a method for responding to multidimensional user queries on flood with remote sensing and auxiliary data integration is provided. The processor-implemented method includes receiving, via an input/output (I/O) interface, at least one query on flood from a user and pre-processing the received at least one query to extract one or more key features using a natural language processing (NLP) model for the text and a convolutional neural network (CNN) model for the image. The at least one query includes one or more key features in the form of a text, a raster image and both.

Further, the processor-implemented method includes integrating the extracted one or more key features using a graphical neural network (GNN) model to generate a structured data representation such as graph, performing a query embedding on the received at least one query and the generated structured data representation to convert the at least one query into a numerical vector representation and fetching an information from a pre-generated vector database based on the numerical vector representation using a graph-based conveyor belt weighting model to generate response for the at least one query on flood from the user.

In another embodiment, a system for responding to multidimensional user queries on flood with remote sensing and auxiliary data integration is provided. The system comprises a memory storing a plurality of instructions, one or more Input/Output (I/O) interfaces, and one or more hardware processors coupled to the memory via the one or more I/O interfaces. The one or more hardware processors are configured by the instructions to receive, via an Input/Output (I/O) interface, at least one query on flood from a user and pre-process the received at least one query to extract one or more key features using a natural language processing (NLP) model for the text and a convolutional neural network (CNN) model for the image. The at least one query includes one or more key features in the form of text, raster image and both.

The one or more hardware processors are configured by the instructions to integrate the extracted one or more key features using a graphical neural network (GNN) model to generate a structured data representation such as graph, perform a query embedding on the received at least one query and the generated structured data representation to convert the at least one query into a numerical vector representation, and fetch an information from a pre-generated vector database based on the numerical vector representation using a graph-based conveyor belt weighting model to generate response for the at least one query on flood from the user.

In yet another aspect, there are provided one or more non-transitory machine-readable information storage mediums comprising one or more instructions, which when executed by one or more hardware processors causes a method for responding to multidimensional user queries on flood with remote sensing and auxiliary data integration is provided. The processor-implemented method includes receiving, via an input/output (I/O) interface, at least one query on flood from a user and pre-processing the received at least one query to extract one or more key features using a natural language processing (NLP) model for the text and a convolutional neural network (CNN) model for the image. The at least one query includes one or more key features in the form of a text, a raster image and both.

Further, the processor-implemented method includes integrating the extracted one or more key features using a graphical neural network (GNN) model to generate a structured data representation such as graph, performing a query embedding on the received at least one query and the generated structured data representation to convert the at least one query into a numerical vector representation and fetching an information from a pre-generated vector database based on the numerical vector representation using a graph-based conveyor belt weighting model to generate response for the at least one query on flood from the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is an exemplary flow diagram illustrating a processor-implemented method for responding to multidimensional user queries on flood with remote sensing and auxiliary data integration, according to some embodiments of the present disclosure.

Figure 4D:
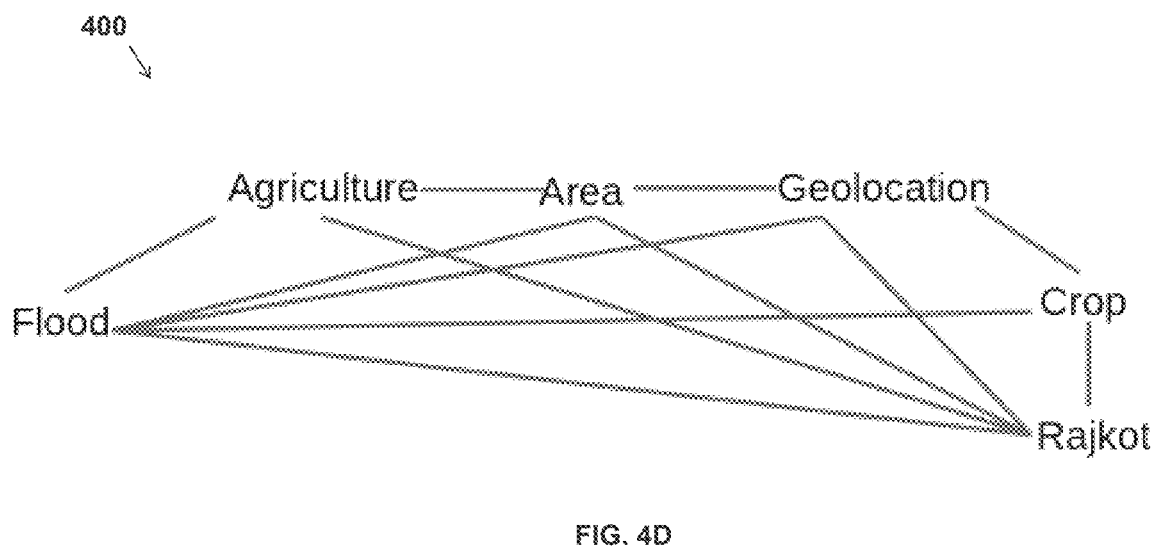

FIG. 4A through 4F are schematic diagrams illustrating possible combinations of query graphs, according to some embodiments of the present disclosure.

DETAILED DESCRIPTION

Figure 1:
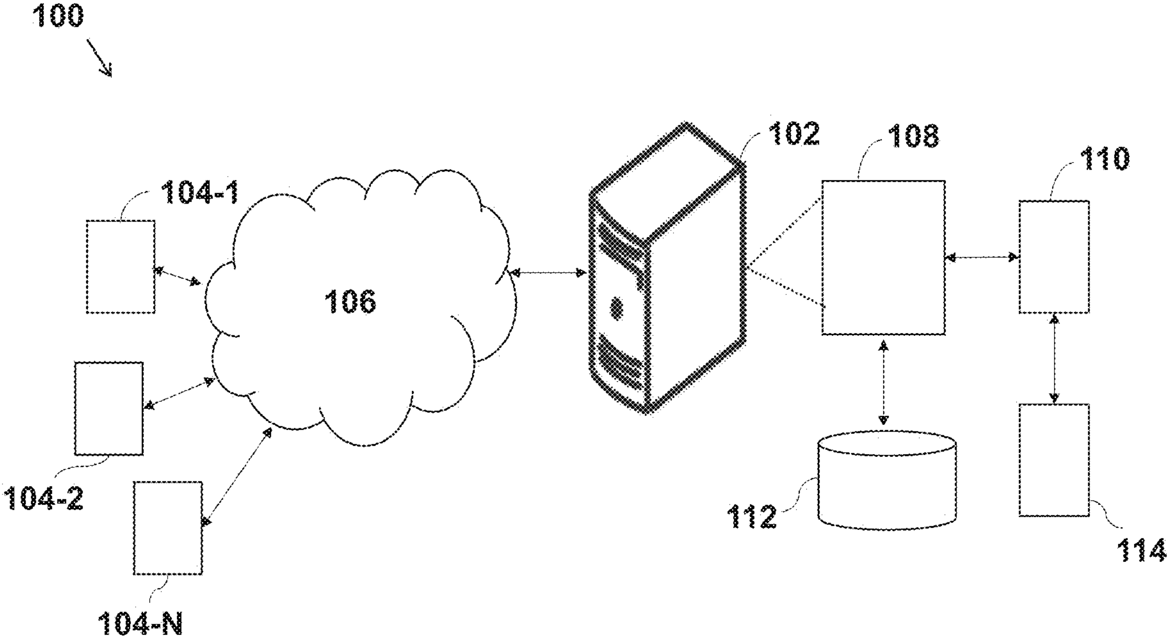
FIG. 1 illustrates a block diagram of a system for responding to multidimensional user queries on flood with remote sensing and auxiliary data integration, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A GenAI-based system can manage and respond to a large number of queries simultaneously, ensuring that users receive timely information even during peak times, such as ongoing flood events. Unlike human experts, the GenAI based system can operate round the clock, providing users with access to critical information anytime, which is especially crucial during emergencies. The system can offer detailed risk assessments, incorporating factors like flood history, topography, and climate models. It can then suggest mitigation strategies, helping decision-makers in the agriculture sector. Automating the response to flood-related queries can free up human experts to focus on more complex tasks, improving overall efficiency. The system can handle routine inquiries, while experts can intervene in more nuanced cases.

The GenAI based system can integrate data from diverse sources such as historical flood records, real-time weather data, geographic information systems (GIS), and scientific research. This enables the system to provide comprehensive, context-aware answers. By continuously learning from new data, the GenAI based system can offer the latest information, such as current flood warnings, ongoing flood events, and the latest research on flood management strategies. GenAI based system can tailor responses based on the user's location, the type of query, and their specific needs (e.g., a farmer seeking advice on crop protection strategies for flooding events). This personalization enhances the relevance and usefulness of the information provided. The system can simulate different flood scenarios based on user inputs (e.g., rainfall forecasts, river levels) and generate suggestions tailored to the user's context. A GenAI-based system can manage and respond to a large number of queries simultaneously, ensuring that users receive timely information even during peak times, such as ongoing flood events.

Unlike human experts, a GenAI system can operate around the clock, providing users with access to critical information anytime, which is especially crucial during emergencies. The system can offer detailed risk assessments, incorporating factors like flood history, topography, and climate models. It can then suggest mitigation strategies, helping decision-makers in the agriculture sector. Automating the response to flood-related queries can free up human experts to focus on more complex tasks, improving overall efficiency. The system can handle routine inquiries, while experts can intervene in more nuanced cases. Deploying a GenAI system can reduce the need for extensive human resources and infrastructure, leading to significant cost savings in flood management and emergency response operations. By leveraging vast amounts of data, providing personalized and real-time responses, and supporting decision-making processes, such a system can significantly enhance flood preparedness, response, and mitigation efforts. Its scalability, cost-effectiveness, and ability to educate and empower users make it an invaluable tool in the face of increasing flood risks.

Importantly, the GenAI-based system answers flood-related queries, choosing the right information sources, critical to ensuring the accuracy, relevance, and comprehensiveness of the responses. Assigning weightage to different information sources (which includes data in text format, vector data, raster images and geospatial data in 2D/3D format) in the GenAI based system is crucial for ensuring that the system prioritizes the most reliable, relevant, and up-to-date information when generating responses. The weightage should reflect the credibility, relevance, and timeliness of each source in relation to the type of query being answered. However, assigning weightage to information sources in a GenAI system comes with several challenges such as dynamic nature of information, diverse types of queries, bias in source selection, complexity in balancing multiple sources, verifiability and source reliability etc. that can impact the accuracy, relevance, and reliability of the responses generated.

Therefore, a robust weighted algorithm is crucial for ensuring that a GenAI system prioritizes the most reliable, relevant, and timely information sources when generating responses. It allows the system to balance diverse data inputs, adapt to changing contexts, and reduce bias, ultimately improving the accuracy and trustworthiness of the output. By dynamically adjusting the weightage based on query type, source credibility, and user needs, a robust algorithm ensures that the system consistently delivers high-quality, contextually appropriate answers.

Considering the advantages of GenAI, embodiments herein propose a GenAI based method and system to generate multi-dimensional flood-related user query response(s) by analyzing extensive or big geospatial data. The big geospatial data includes spatially distributed flood inundation and flood probability maps which can be generated by using a Machine Learning (ML) model. The ML model considers input parameters such as Farm Sustainability Index (FSI) and impact of Moon gravitational force on Earth along with other parameters such as spatially distributed land subsidence, spatially distributed surface topography, spatially distributed predicted rainfall and temperature and land use and land cover (LULC) map for generating spatially distributed flood inundation and flood probability maps.

Furthermore, the disclosed system integrates auxiliary real-time updated datasets such as historical flood events, terrain information, river and stream networks, floodplain maps, climatic data, damage reports, and soil and land use documents provided by the user, in both image and text formats. By synthesizing this diverse information, the GenAI model can offer comprehensive insights at farm-to-regional-level related to crop damage, crop productivity, flood risk assessment, soil erosion and nutrient loss, pest and disease outbreak, market disruption, flood resistant crops, sustainable land management and many more. This capability allows for the identification of vulnerable areas, assessment of risk levels, and formulation of effective mitigation strategies. The AI's ability to process and interpret complex, multi-layered geospatial data ensures that responses are accurate, contextually relevant, and actionable, aiding in the proactive management of flood risks in agricultural regions.

Additionally, the GenAI model can continuously learn and improve response related to flood by incorporating real-time data and feedback from previous events. This adaptability ensures that response remains relevant and accurate over time. The technology can also suggest optimal land management practices and infrastructure improvements to mitigate flood risks. By providing precise and actionable insights, GenAI helps safeguard crops, livestock, and livelihoods, enhancing the overall resilience of agricultural regions against floods.

Referring now to the drawings, and more particularly to FIG. 1 through FIG. 6C, where similar reference characters denote corresponding features consistently throughout the figures, there are shown preferred embodiments, and these embodiments are described in the context of the following exemplary system and/or method.

FIG. 1 illustrates a block diagram of a system 100 for responding to multidimensional user queries on flood with remote sensing and auxiliary data integration, according to some embodiments of the present disclosure. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 is communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory 110 with a plurality of instructions, one or more databases 112, and one or more hardware processors 108 which are communicatively coupled with the at least one memory to execute a plurality of modules 114 therein. The components and functionalities of the system 100 are described further in detail.

Figure 2:
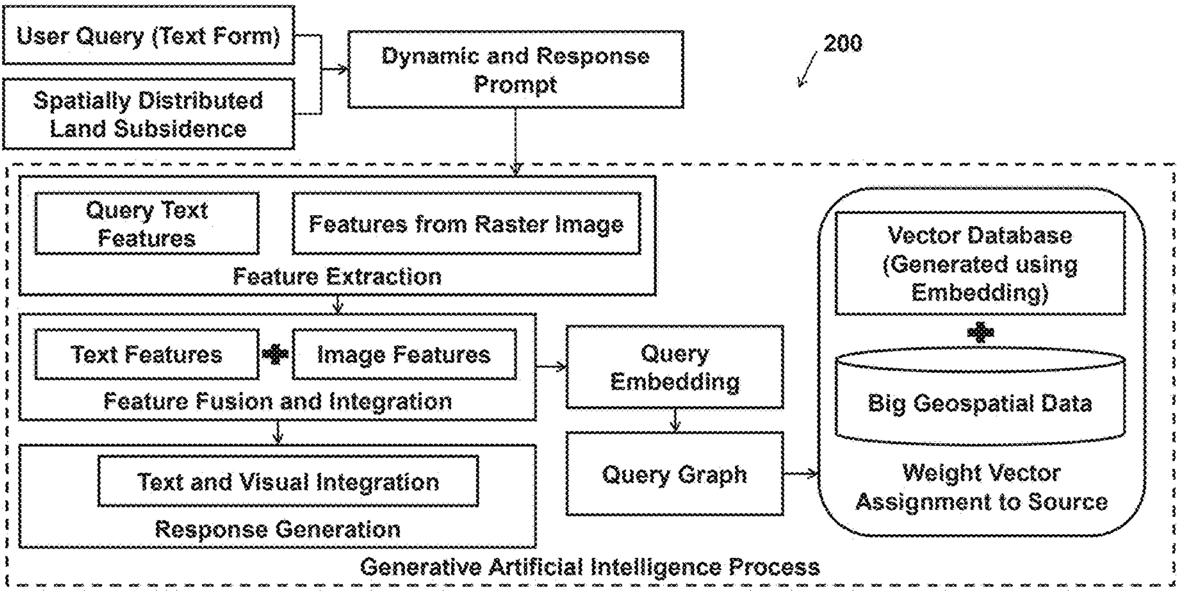
FIG. 2 is a functional block diagram illustrating the system of FIG. 1 for responding to multidimensional user queries on flood with remote sensing and auxiliary data integration, according to some embodiments of the present disclosure.
Figure 4A:
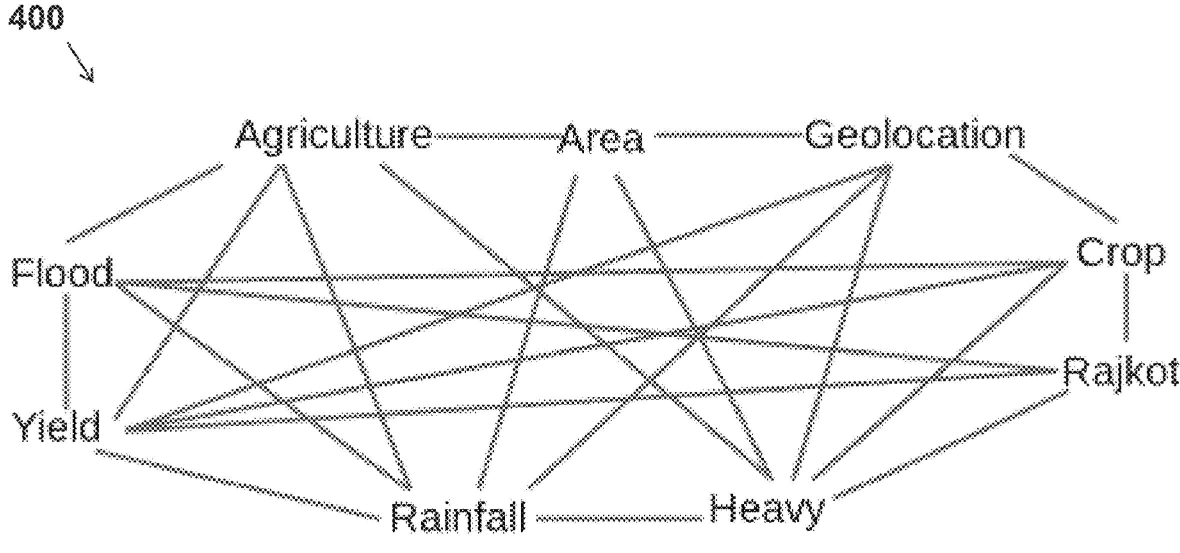
Figure 4B:
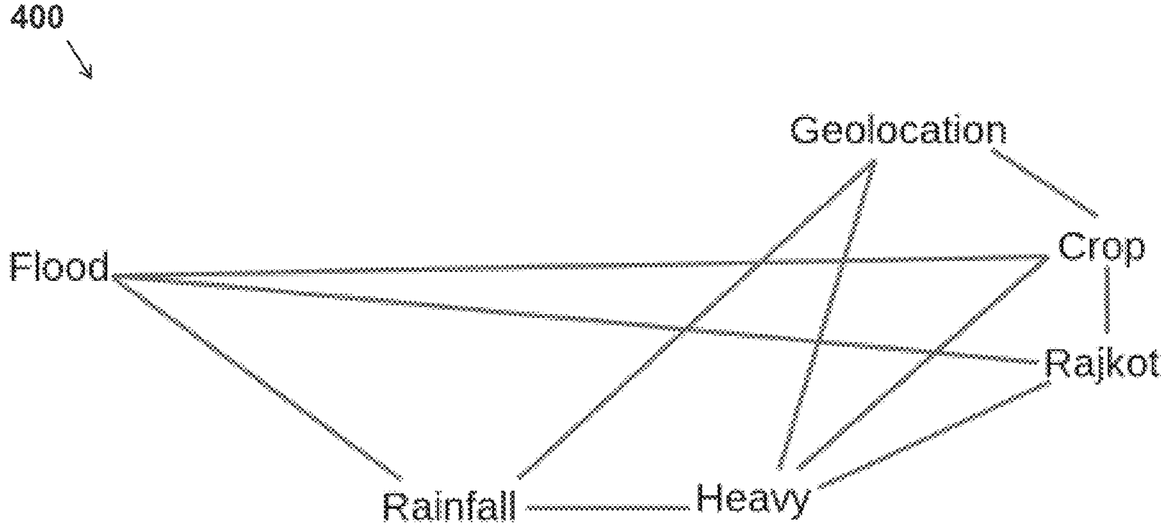
Figure 4C:
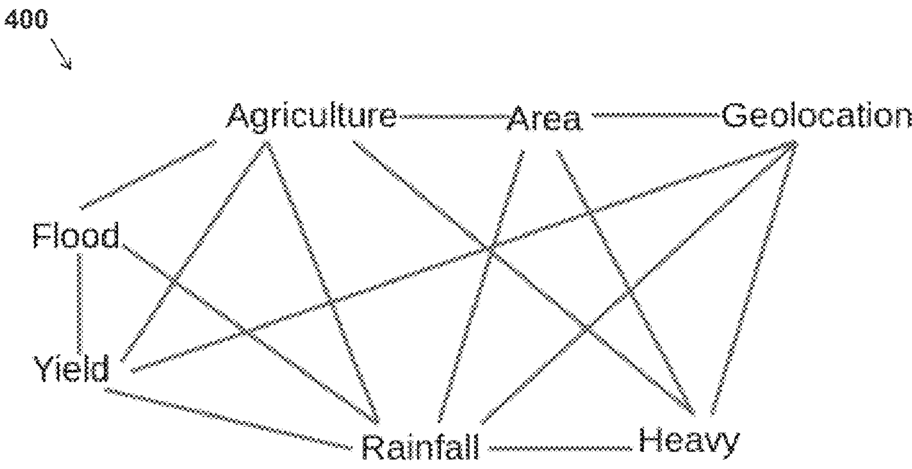
Figure 4E:
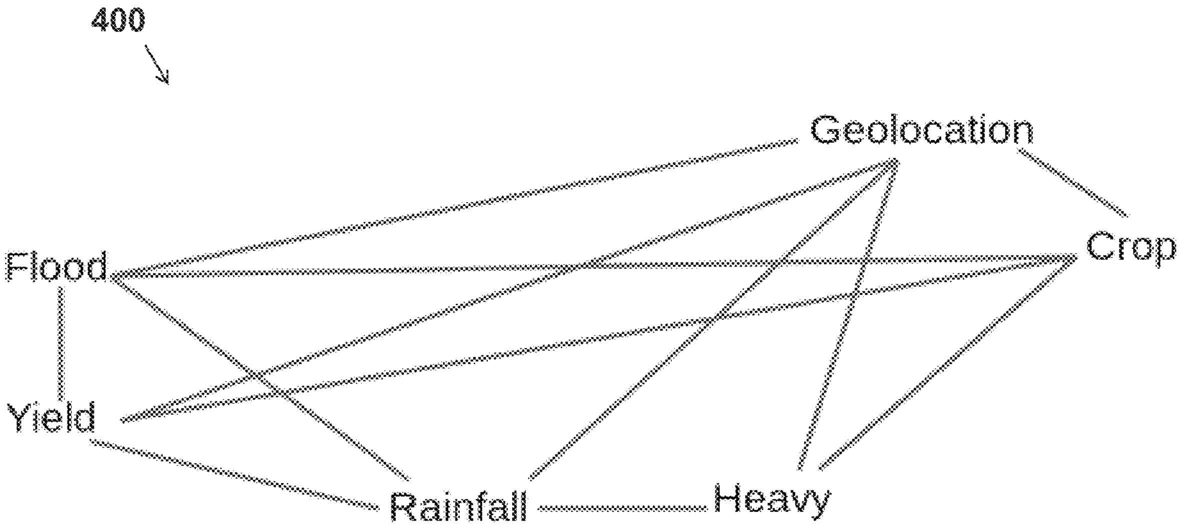
Figure 4F:
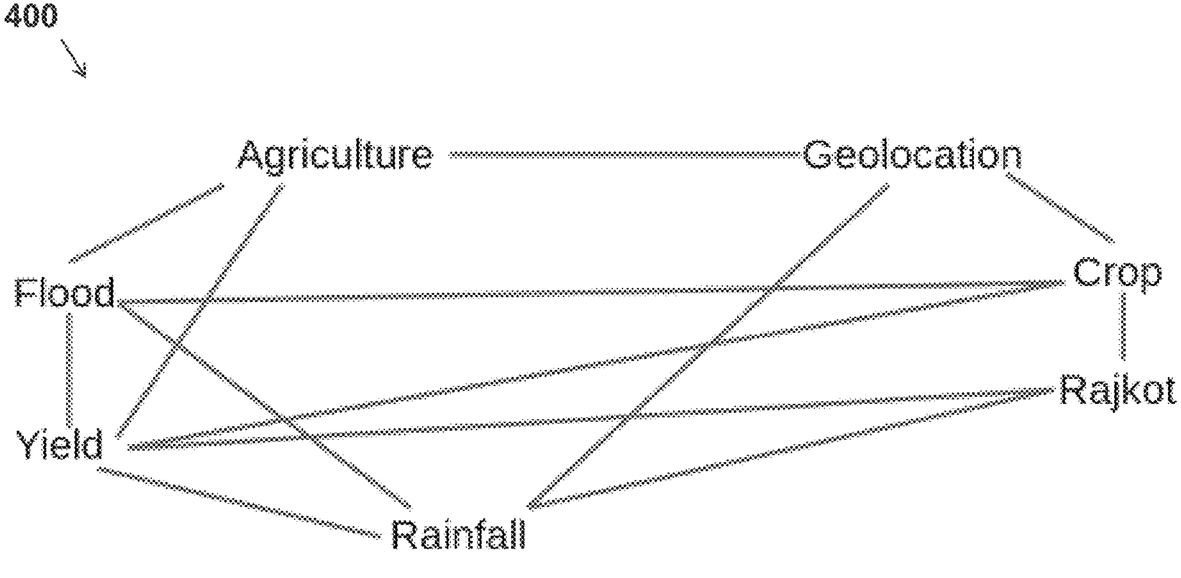

FIG. 2 is a functional block diagram 200 to illustrate the system 100 for responding to multidimensional user queries on flood with remote sensing and auxiliary data integration, according to some embodiments of the present disclosure. Herein, the system using GenAI which responds to the user query (text and spatially distributed map) related to flood by analyzing big geospatial vector database (spatially distributed flood inundation maps and flood probability maps) along with other auxiliary datasets in vector form provided to GenAI model. Importantly, a conveyor belt data model is introduced which provides weights to each source of information. Knowledge will be extracted based on the weight assigned to the source.

Firstly, the user sends a query to a generative artificial intelligence (GenAI) model based dynamic and responsive prompt in the form of text or raster image or both. Initially, one or more key features from the text query are extracted using a Natural Language Processing (NLP) model whereas terrain image features are extracted using a Convolutional Neural Networks (CNN). Next, integrating text and image features using Graph Neural Networks (GNNs) involves leveraging the capabilities of GNNs to process structured data representations, such as graphs, where nodes and edges can represent different elements of both text and image data.

Secondly, the user query embedding is performed which refers to the process of converting a user query, typically in the form of text or raster image, into a numerical vector representation that captures its semantic meaning and context. This numerical vector representation enables machines, particularly the natural language processing (NLP) model, to understand and process the query effectively. Based on the user query, the information is extracted from a vector database (i.e. big geospatial data and auxiliary database combined). It is important to highlight that the information is extracted based on the conveyor belt weighting model.

FIG. 3 is a flow diagram illustrating a processor-implemented method 300 for responding to multidimensional user queries on flood with remote sensing and auxiliary data integration implemented by the system 100 of FIG. 1, in accordance with an embodiment of the present disclosure. Functions of the components of the system 100 are now explained through steps of flow diagram in FIG. 3, according to some embodiments of the present disclosure. In the method and system for responding to multidimensional user queries on flood with remote sensing and auxiliary data integration.

Initially, at step 302 of the processor-implemented method 300, the one or more hardware processors 108 are configured by the programmed instructions to receive at least one query on flood from a user. The at least one query includes one or more key features in the form of text, raster image or both.

At the next step 304 of the processor-implemented method 300, the one or more hardware processors 108 are configured by the programmed instructions to pre-process the received at least one query to extract one or more key features using a natural language processing (NLP) model for the text and a convolutional neural network (CNN) model for the image.

At the next step 306 of the processor-implemented method 300, the one or more hardware processors 108 are configured by the programmed instructions to integrate the extracted one or more key features using a graph-based Gen-AI model such as a graphical neural network (GNN) model to generate a structured data representation such as graph. Herein, the structured data representation includes one or more nodes and one or more edges to represent the extracted one or more features.

In one example, suppose a user has sent a query in the prompt—How much agriculture area, crop, and yield in Rajkot will be impacted by the flood occurred due to heavy rainfall in the given geo-reference image? Now in this question, there are 9 key features such as agriculture, area, crop, yield, flood, Rajkot, rainfall, heavy, geolocation (in 2D form). Based on these key features, multiple combinations of connected graphs (called here as Query n Graph m; where n, m=1, 2, 3 . . . n) can be created, for example, as shown in FIG. 4A through 4F.

The number of possible combinations of connected query graphs that can be created based on user query features can be determined based on the formula given below:

$$C(n, r) = n!/r!(n-r)! \tag{1}$$

wherein, n represents a number of key features to choose from and r represents the number of key features selected for the subset.

So based on 9 key features, the total number of all possible combinations is 511. This does not include an empty set. Please note that features in a particular graph can be arranged in multiple ways. Now code will be assigned to each graph, for example—Query 1 Graph 1, Query 1 Graph 2, Query 1 Graph 3, Query 1 Graph 4, Query 1 Graph 5, Query 1 Graph 6 as shown in FIGS. 4A through 4F.

At the next step 308 of the processor-implemented method 300, the one or more hardware processors 108 are configured by the programmed instructions to perform a query embedding on the received at least one query and the generated structured data representation to convert the at least one query into a numerical vector representation. The numerical vector representation captures semantic meaning and context of the flood related user query which further enables machines, particularly natural language processing (NLP) models, to understand and process the flood related user query effectively.

Finally, at the last step 310 of the processor-implemented method 300, the one or more hardware processors 108 are configured by the programmed instructions to fetch an information from a pre-generated vector database based on the numerical vector representation using a graph-based conveyor belt weighting model to generate response for the at least one query on flood from the user.

Herein, the vector database is created by transforming a geospatial database and an auxiliary database using an embedding technique. The geospatial database is created based on a spatially distributed georeferenced flood inundation map and a spatially distributed georeferenced flood probability map. The auxiliary database is created based on the auxiliary information that is gathered from time-series satellite data, sensor-based data or published reports, such as the flood event history, terrain information, river and stream network, floodplain map, climatic data (precipitation, temperature, humidity), flood-based damage reports, and soil and land use data.

Figure 5:
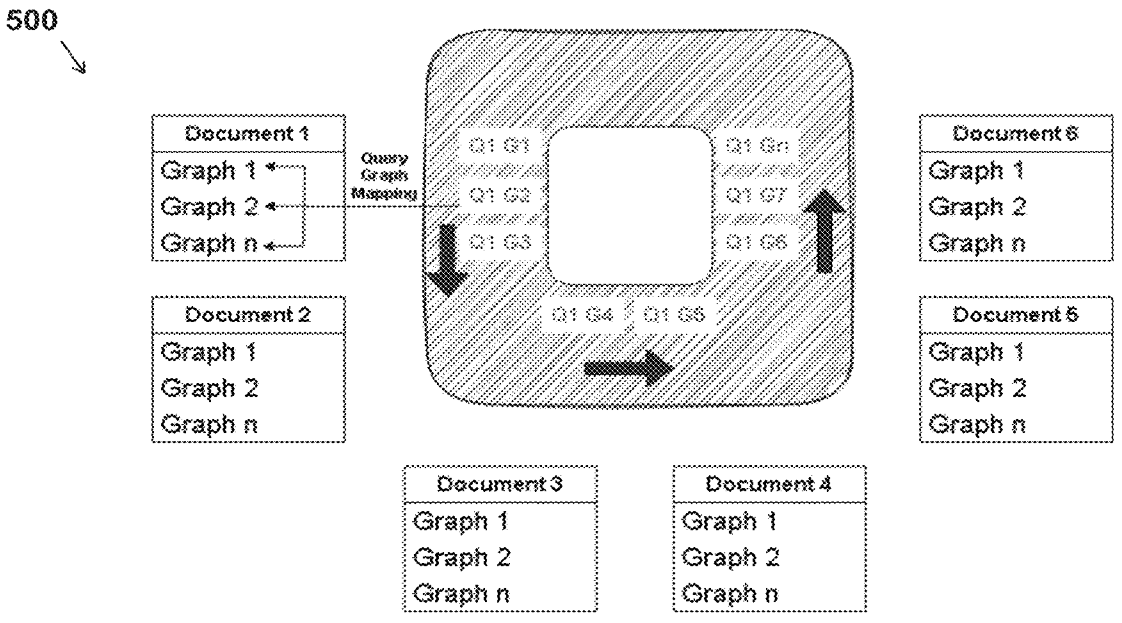
FIG. 5 is a block diagram illustrating a graph-based conveyor belt weighting model, according to some embodiments of the present disclosure.
Figure 6A:
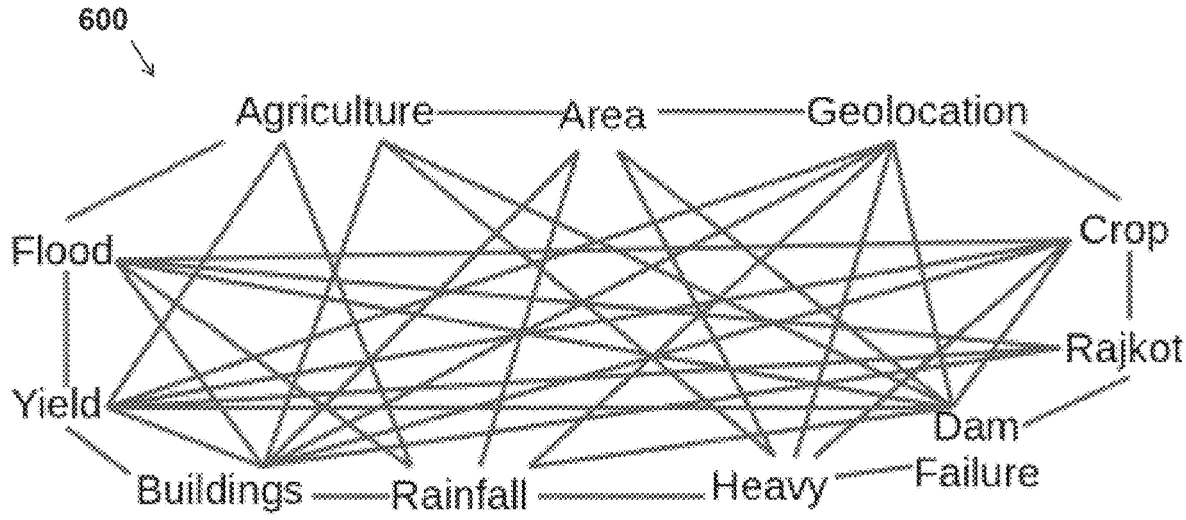
FIG. 6A through 6C are schematic diagrams illustrating possible graphs from a particular auxiliary information source, according to some embodiments of the present disclosure.
Figure 6B:
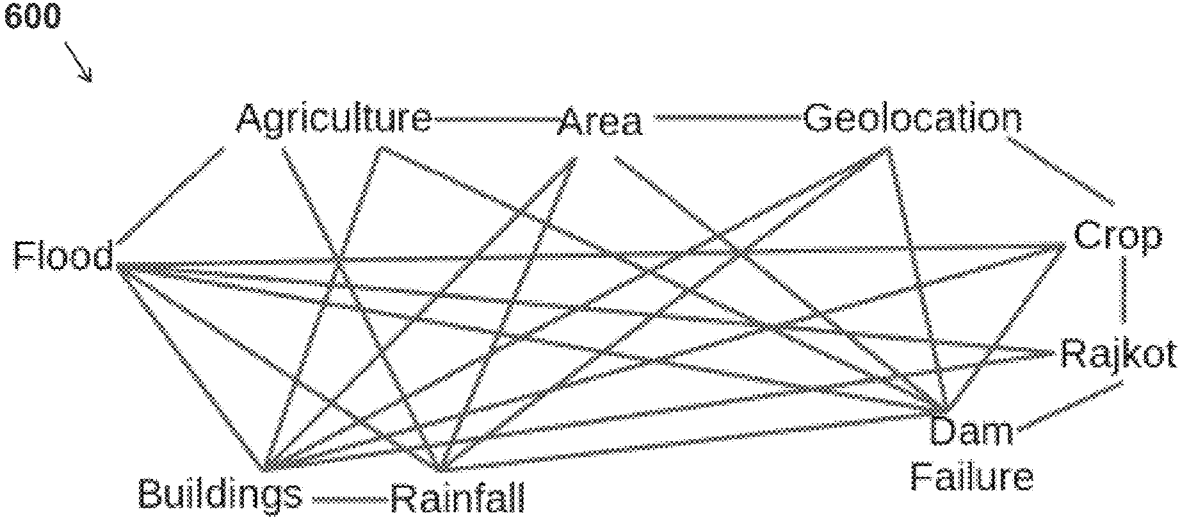
Figure 6C:
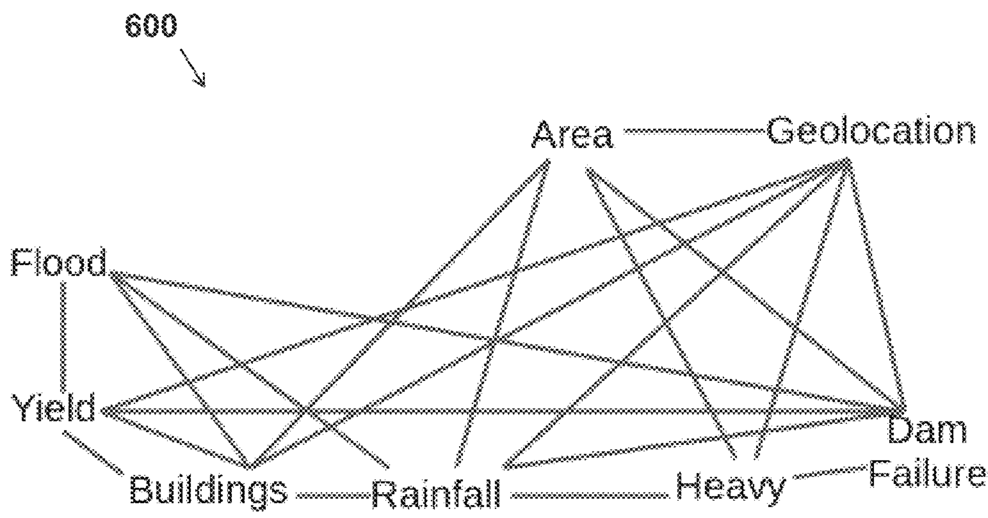

Referring FIG. 5, a block diagram 500, the graph-based conveyor belt weighting model comprises creating a plurality of combinations of connected query graphs based on the one or more key features that are extracted from the flood related user query. Further, a unique code is assigned to each created connected query graph of the plurality of connected graphs. A document graph is created for each auxiliary information source based on features of the respective auxiliary information source. For example, the first auxiliary information source is flood event history—the common elements that flood event history may encompass includes Date and Time, Geolocation, Impacted Areas, Severity, Causes, Damage Assessment, Response and Recovery Efforts, Causal Factors, Historical Context and Documentation and Reporting. So, multiple connected graphs i.e. doc graphs are possible based on key features from this particular information source i.e. Flood Event History. Similarly, multiple document graphs associated with each auxiliary information source can be created as shown in FIG. 6A, FIG. 6B and FIG. 6C.

On the other hand, for each structured or unstructured auxiliary information source i.e. Flood Event History, terrain information, river and stream network, floodplain map, climatic data (precipitation, temperature, humidity), flood based damage reports, soil and land use data, and big geospatial data (i.e. spatially distributed georeferenced flood inundation map along with spatially distributed georeferenced flood probability map), an internal graph (name here as Doc n Graph m; where n, m=1, 2, 3, . . . ) have been created based on key features of the individual source and indexing has been done in advance in each information source.

All the created document graphs are indexed, and the created auxiliary information sources are then laid on the conveyor belt. Each Query Graph (e.g. Query 1 Graph 1 to Query 1 Graph 6 as shown in FIGS. 4A, 4B, 4C, 4D, 4E and 4F) may be overlaid over the document n graph m sequentially. The auxiliary information source with highest query graph to document graph match will be given highest weightage. Similarly, the second highest match may give the second highest weight and so on. Later, responses may be extracted from the multiple auxiliary information sources based on the weights provided.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein address unresolved problems of assigning weightage to information sources in a GenAI model for responding to user queries on flood. Embodiments herein provide a method and system for responding to multidimensional user queries on flood with remote sensing and auxiliary data integration. Herein, the user query is responded by analyzing big geospatial vector database comprising spatially distributed flood inundation maps and flood probability maps along with other auxiliary datasets in vector form provided to the GenAI model. The other auxiliary datasets include flood event history, terrain information, river and stream network, floodplain map, climatic data, previous damage reports, soil and land use data. These auxiliary datasets will be continuously updated time-to-time. Importantly, a conveyor belt weighting model is introduced to provide weights to each source of information and the response by GenAI model is prepared based on the weights assigned to the information sources.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

receiving, via an input/output (I/O) interface, at least one query on flood from a user, wherein the at least one query includes one or more key features in at least one of the forms comprising a text, a raster image and both;

pre-processing, via one or more hardware processors, the received at least one query to extract one or more key features using a natural language processing (NLP) model for the text and a convolutional neural network (CNN) model for the image;

integrating, via one or more hardware processors, the extracted one or more key features using a graphical neural network (GNN) model to generate a structured data representation in graphical form, wherein the structured data representation includes one or more nodes and one or more edges to represent the extracted one or more features;

performing, via the one or more hardware processors, a query embedding on the received at least one query and the generated structured data representation to convert the at least one query into a numerical vector representation, wherein the numerical vector representation captures semantic meaning and context of the at least one query; and fetching, via the one or more hardware processors, an information from a pre-generated vector database based on the numerical vector representation using a graph-based conveyor belt weighting model to generate response for the at least one query on flood from the user.

2. The processor-implemented method of claim 1, wherein the vector database is created by transforming a geospatial database and an auxiliary database using an embedding technique.

3. The processor-implemented method of claim 2, wherein the geospatial database is created based on a spatially distributed georeferenced flood inundation map and a spatially distributed georeferenced flood probability map.

4. The processor-implemented method of claim 2, wherein the auxiliary database is created based on the auxiliary information that is gathered from time-series satellite data, sensor-based data or published reports, such as the flood event history, terrain information, river and stream network, floodplain map, climatic data (precipitation, temperature, humidity), flood-based damage reports, and soil and land use data.

5. The processor-implemented method of claim 1, wherein the graph-based conveyor belt weighting model comprising:

creating a plurality of combinations of connected query graphs based on the one or more key features extracted from the at least one query;

assigning a unique code to each created connected query graph of the plurality of combinations of connected graphs;

moving each created connected query graph on a conveyor belt;

creating one or more document graphs for each auxiliary information source based on one or more key features of the respective auxiliary information source;

indexing the created one or more document graphs to determine weightage to an auxiliary information source, wherein the indexed one or more document graphs are laid on the conveyor belt to lay each connected query graph over each document graph sequentially; and extracting information from the auxiliary information source with highest weightage.

6. The processor-implemented method of claim 5, wherein the plurality of combinations of connected query graphs created based on the one or more key features are determined by:

$$C(n, r) = n!/r!(n-r)!$$

wherein, n represents a number of key features to choose from and r represents the number of key features selected for the subset.

7. A system comprising:

a memory storing instructions;

one or more Input/Output (I/O) interfaces; and one or more hardware processors coupled to the memory via the one or more I/O interfaces, wherein the one or more hardware processors are configured by the instructions to:

receive at least one query on flood from a user, wherein the at least one query includes one or more key features in at least one of the forms comprising text, raster image and both;

pre-process the received at least one query to extract one or more key features using a natural language processing (NLP) model for the text and a convolutional neural network (CNN) model for the image;

integrate the extracted one or more key features using a graphical neural network (GNN) model to generate a structured data representation in graphical form, wherein the structured data representation includes one or more nodes and one or more edges to represent the extracted one or more features;

perform a query embedding on the received at least one query and the generated structured data representation to convert the at least one query into a numerical vector representation, wherein the numerical vector representation captures semantic meaning and context of the at least one query; and fetch an information from a pre-generated vector database based on the numerical vector representation using a graph-based conveyor belt weighting model to generate response for the at least one query on flood from the user.

8. The system of claim 7, wherein the vector database is created by transforming a geospatial database and an auxiliary database using an embedding technique.

9. The system of claim 8, wherein the geospatial database is created based on a spatially distributed georeferenced flood inundation map and a spatially distributed georeferenced flood probability map.

10. The system of claim 8, wherein the auxiliary database is created based on the auxiliary information that is gathered from time-series satellite data, sensor-based data or published reports, such as the flood event history, terrain information, river and stream network, floodplain map, climatic data (precipitation, temperature, humidity), flood-based damage reports, and soil and land use data.

11. The system of claim 7, wherein the graph-based conveyor belt weighting model comprising:

creating a plurality of combinations of connected query graphs based on the one or more key features extracted from the at least one query;

assigning a unique code to each created connected query graph of the plurality of combinations of connected graphs;

moving each created connected query graph on a conveyor belt;

creating one or more document graphs for each auxiliary information source based on one or more key features of the respective auxiliary information source;

indexing the created one or more document graphs to determine weightage to an auxiliary information source, wherein the indexed one or more document graphs are laid on the conveyor belt to lay each connected query graph over each document graph sequentially; and extracting information from the auxiliary information source with highest weightage.

12. The system of claim 11, wherein the plurality of combinations of connected query graphs is created based on the one or more key features are determined by:

$$C(n, r) = n!/r!(n-r)!$$

wherein, n represents a number of key features to choose from and r represents the number of key features selected for the subset.

13. One or more non-transitory machine-readable information storage mediums comprising one or more instructions which when executed by one or more hardware processors cause:

receiving, via an input/output (I/O) interface, at least one query on flood from a user, wherein the at least one query includes one or more key features in at least one of the forms further comprising a text, a raster image and both;

pre-processing, the received at least one query to extract one or more key features using a natural language processing (NLP) model for the text and a convolutional neural network (CNN) model for the image;

integrating the extracted one or more key features using a graphical neural network (GNN) model to generate a structured data representation in graphical form, wherein the structured data representation includes one or more nodes and one or more edges to represent the extracted one or more features;

performing a query embedding on the received at least one query and the generated structured data representation to convert the at least one query into a numerical vector representation, wherein the numerical vector representation captures semantic meaning and context of the at least one query; and fetching an information from a pre-generated vector database based on the numerical vector representation using a graph-based conveyor belt weighting model to generate response for the at least one query on flood from the user.

14. The one or more non-transitory machine-readable information storage mediums of claim 13, wherein the vector database is created by transforming a geospatial database and an auxiliary database using an embedding technique.

15. The one or more non-transitory machine-readable information storage mediums of claim 14, wherein the geospatial database is created based on a spatially distributed georeferenced flood inundation map and a spatially distributed georeferenced flood probability map.

16. The one or more non-transitory machine-readable information storage mediums of claim 14, wherein the auxiliary database is created based on the auxiliary information that is gathered from time-series satellite data, sensor-based data or published reports, such as the flood event history, terrain information, river and stream network, floodplain map, climatic data (precipitation, temperature, humidity), flood-based damage reports, and soil and land use data.

17. The one or more non-transitory machine-readable information storage mediums of claim 13, wherein the one or more instructions which when executed by the one or more hardware processors further cause:

creating a plurality of combinations of connected query graphs based on the one or more key features extracted from the at least one query;

assigning a unique code to each created connected query graph of the plurality of combinations of connected graphs;

moving each created connected query graph on a conveyor belt;

creating one or more document graphs for each auxiliary information source based on one or more key features of the respective auxiliary information source;

indexing the created one or more document graphs to determine weightage to an auxiliary information source, wherein the indexed one or more document graphs are laid on the conveyor belt to lay each connected query graph over each document graph sequentially; and extracting information from the auxiliary information source with highest weightage.

18. The one or more non-transitory machine-readable information storage mediums of claim 17, wherein the plurality of combinations of connected query graphs created based on the one or more key features are determined by:

$$C(n, r) = n!/r!(n-r)!$$

wherein, n represents a number of key features to choose from and r represents the number of key features selected for the subset.

* * * * *